Patented Aug. 11, 1936

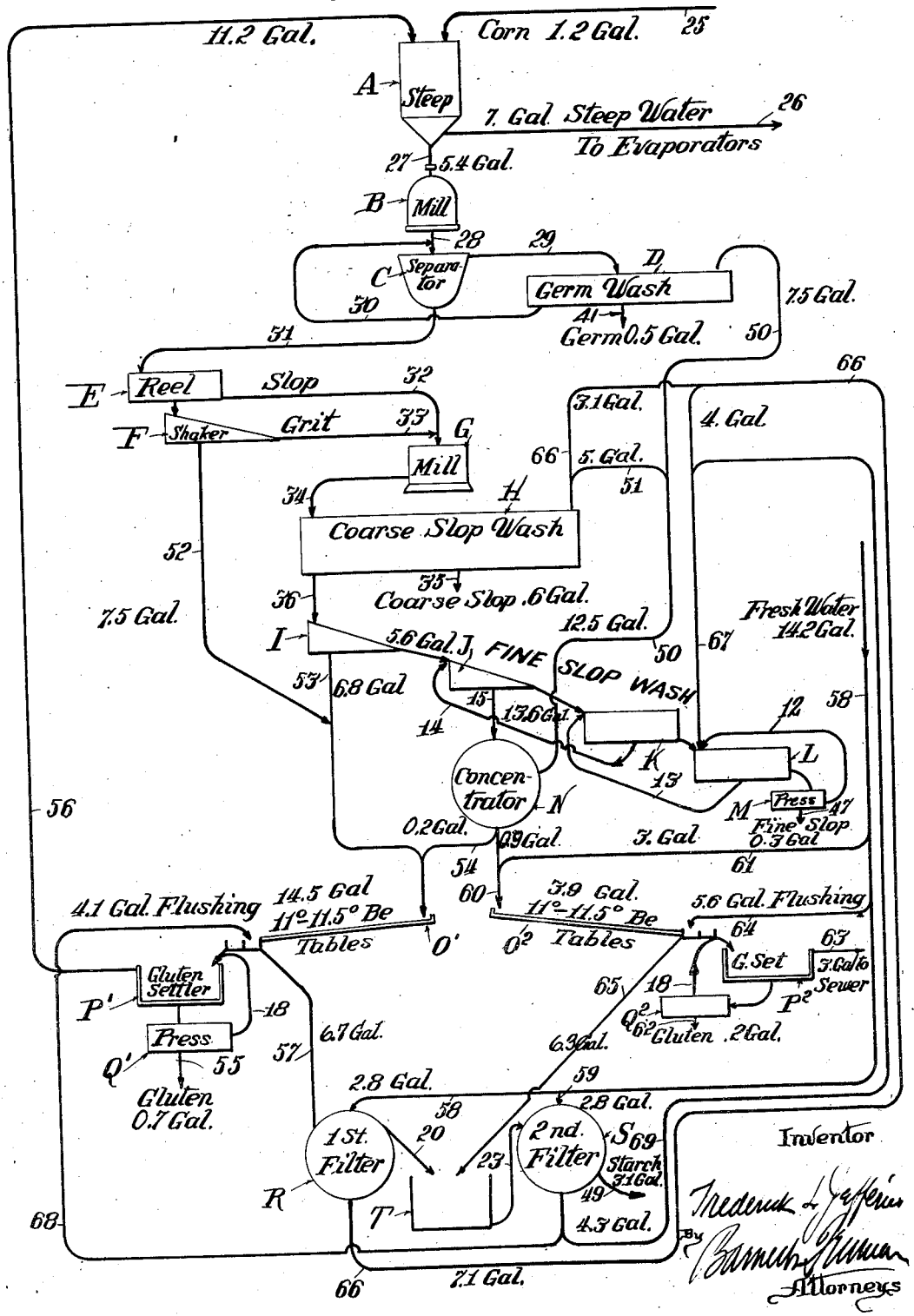

2,050,330

UNITED STATES PATENT OFFICE 2,050,330

MANUFACTURE OF STARCH FROM CORN

Frederick L. Jefferies, La Grange, Ill., assignor to International Patents Development Company, Wilmington, Del., a corporation of Delaware Application April 22, 1932, Serial No. 606,897
Renewed June 21, 1935

36 Claims. (Cl. 127—65)

This invention relates to a method of manufacturing starch from corn which involves steeping the corn, withdrawing and evaporating the steep water, separating the germs, bran and fiber from the starch and gluten by separating operations referred to collectively as the wet starch system, removing the starch from the mixture of water, starch and gluten (starch and gluten liquor or mill starch) for example, by a tabling operation, washing the starch deposited on the tables with fresh water, primarily to remove soluble substances, and separating the gluten from the water over-flowing from the starch tables. United States Patent 1,651,611 to R. O. McCoy, granted December 6, 1927, describes and claims a method, applicable to a starch manufacturing process as above set forth, whereby all of the process water from which the gluten is separated (gluten water) as well as all of the water used for washing the water (starch wash water) is returned and reused in the system; the gluten water being returned in part to the steeps but in a larger measure to the wet starch system, while the starch wash water is used in part for diluting the starch on the tables (flushing) and in part in the wet starch system to supplement the gluten water.

The object of the present invention is to provide certain novel arrangements and methods whereby a major portion of the gluten water may be returned to the steeps and from there to the evaporators, none, preferably, being returned to the wet starch system. There will be a small volume of gluten water which the invention contemplates sending to the sewer. The volume is small and the process is manipulated so that the part of the water going to the sewer will have a very low solubles content and will, therefore, be relatively innocuous and will involve a relatively insignificant loss of corn substance. Fresh water is used as before for washing the starch, and the wash water is preferably reused back in the system but in a novel manner.

In the ordinary operation of a wet starch system the stream of water, starch and gluten going to the tables is made up of three component streams differing considerably as to their solubles contents. The stream from the germ separator and slop and grit reels or shakers will be heaviest in solubles; the stream from the coarse slop wash will contain a smaller amount of solubles; and the stream from the fine slop wash will have a still smaller solubles content. In accordance with the present invention the liquor constituting the third stream is, as a whole or in part tabled and settled, or otherwise treated to remove starch and gluten, preferably after part of the water therein has been removed and returned to the process and preferably after dilution with fresh water. In this way the solubles content of the resultant liquid, which may be run to the sewer or otherwise utilized is reduced to a minimum.

This method has several advantages over that disclosed in the McCoy patent. The operations at all stages of the process subsequent to the steeping operation, are carried out with water which is freer from impurities, soluble and insoluble, than when a considerable proportion of gluten water is returned to the wet starch system. That is, the wet starch operations are carried on with a liquid which is more dilute, more nearly like fresh water, than gluten water. Gluten water is the oldest water in the process and when re-cycled in part to the wet starch system, an indeterminate part may remain in the system for an indefinite time. By moving the fresh water, step by step, from the starch washing filters through the flushing operation and the operations of the wet starch system and thence to the gluten settlers, whence the major portion of it goes directly out of the system through the steeps and the evaporators and the small remaining portion is sent to the sewer, a "straight" system is provided which minimizes micro-organic or other activity tending to produce impurities which are difficult to remove in the washing filters so that the process results in a purer starch.

That is the period of time that the water remains in the system is shortened and the possibility of repeated re-cycling of some of the same process water is eliminated. The water control is also simplified. Just as much fresh water is introduced into the system as may be required. Other objects and advantages of the improved method will be adverted to in the following description of a preferred embodiment of the invention.

The drawing is a flow-sheet illustrating a system, in accordance with this invention, having a normal draw-off from the steeps of approximately seven gallons per bushel, of corn ground, and a discharge to the sewer of a small amount, about three gallons of process water containing a very small quantity of soluble substances.

In the drawing, the figures preceding the abbreviation "Gal." represent the quantities of water in gallons and for fractions thereof per bushel of corn operated on.

Referring to the drawing: A designates the steeping system, of which only a single steep tank is shown. Ordinarily the corn is steeped on the counter-current principle in a series of steep tanks. B designates the Foos mill for breaking up the steeped corn; and C designates a gravity separator by means of which the germs are floated off from the other ingredients of the grain for washing in the germ washing system indicated at D. The residue of the grain passes through a reel E, which eliminates the bran and fiber, commonly called "coarse slop", and then through a shaker F which separates the grits or broken kernels from the water mixture of starch and gluten which latter passes into the conduit 52 from the shaker. The slop and grits are ground in a mill G, and then subjected to a series of separating operations indicated at H and commonly called, collectively, the "course slop wash"; this operation being performed in copper reels arranged for counter-current operation. The starch and gluten mixture from the coarse slop wash, which includes fine particles of bran and fiber, is passed through a draining shaker I to separate out the fibre and bran known as "fine slop"; the purified starch and gluten liquor passing into the conduit 53 from the draining shaker I. The fine slop tailing off from the draining shaker I passes into the "fine slop wash" which consists of a series of shakers and/or reels arranged on the counter-current principle. In the drawing, the system is shown as consisting of a shaker J, two reels K and L, and press M for the slop from reel L. Water from the press goes back through conduit 12 to reel L. Water from L goes back through conduit 13 to reel K, and water from K goes back through conduit 14 to shaker J. The purified starch and gluten liquor passes from shaker J into the conduit 15.

Conduit 15 leads from the shaker J to concentrator N which may be any suitable device, such as a de-watering filter, for concentrating the starch and gluten mixture by eliminating such quantity of water as is necessary to effect the desired concentration. The concentrated material passes in part into a pipe 54 and the rest into pipe 60. Conduits 52, 53 and 54 are united and deliver a mixture of the concentrated and unconcentrated starch and gluten liquors to the starch tables O' or other devices used for separating the gluten and bulk of water from the starch; the starch being deposited on the tables, and the gluten and water flowing into a gluten settler P' in which the gluten subsides, and from which it is withdrawn and pressed in the press Q', the press water going back to the settler through pipe 18. The starch is flushed from the tables O' by the usual cyclic method, which for purposes of simplification is not shown in detail, the starch milk passing through pipe 57 to the apparatus for extracting the solubles from the starch. This apparatus may consist of two or more filters preferably of the displacement type in which the starch is first de-watered and then washed with fresh water. The first filter is designated R on the drawing, the second filter S, and the intervening dilution tank T. The washed starch stripped from filter R passes into the dilution tank T, as indicated by the line 20. The diluted starch is pumped through pipe 23 into the second filter S where it is de-watered and then sprayed with fresh water from the branch 59 of the fresh water pipe 58.

The part of the concentrated starch liquor passing from concentrator N into pipe 60 is diluted with fresh water from a branch pipe 61 of the fresh water supply pipe 58 and the diluted liquor is caused to flow over starch tables O², the gluten and major portion of the water passing into the gluten settler P². The overflow from this gluten settler, as indicated at 63, may be to the sewer.

The other connections will be referred to in the summary of operation which follows:

*Operation.*—The corn containing 1.2 gallons of water enters the steeps A through pipe 25. The term "pipe" is to be understood throughout this specification as including any species of conduit or other means for conducting the material from point to point in the process. 7 gallons of steep water are drawn off from the steeps to the evaporators by pipe 26. The steeped corn containing 5.4 gallons of water passes through pipe 27 to the mill B and the ground material goes from the mill through pipe 28 to the separator C. The germs floated off in the separator pass through pipe 29 to the germ wash E, starch milk from the germ wash passing back to the separators through pipe 30. The germs, containing 0.5 gallon of water are discharged from the germ wash through pipe 41. The degerminated corn passes from the separator through pipe 31 to reel E, the liquor from which passes through the shaker F. The slop from reel E and the grits from shaker F pass through pipes 32 and 33 respectively to the mill G where they are ground, and from which the ground material passes through pipe 34 to the coarse slop wash H. The coarse slop discharged from the coarse slop wash H at 35 contains 0.6 gallon of water. The starch milk from the coarse slop wash passes through pipe 36 to reel I and thence into pipe 53. The tailings from reel I, containing 5.6 gallons of water, pass to shaker J of the fine slop wash and then, successively, through the reels K and L and to press M, from which the fine slop containing 0.3 gallon of water is discharged at 47. Starch milk from L passes through pipe 13 to K. Starch milk from K passes through pipe 14 to shaker J. The starch milk issuing from the fine slop wash through pipe 15 contains 13.6 gallons of water and goes to the concentrator N.

The starch milk from shaker F, 7.5 gallons in pipe 52, unites with 6.8 gallons in pipe 53 from the draining reel I, and concentrated material delivered from the concentrator N, a part of which containing 0.2 gallon of water passes into conduit 54. The combined streams, after having been mixed together in any suitable mixer (not shown) are flowed over the high soluble tables O'. This mixture may have a density of about 11°–11.5° Baumé, and will contain 14.5 gallons of water. The gluten and water from the tables O' flow into gluten settler P', and the gluten is pressed at Q', and goes out of the system at 55, carrying 0.7 gallon of water. All of the gluten water from the settler P', 11.2 gallons, goes through the pipe 56 to the steeping system A. It is a high solubles liquid and may contain 600 grains of solubles substance per gallon of water.

The starch flushed from tables O', containing 6.7 gallons of water, passes through pipe 57 to the first filter R, and thence by pipe 20 to the dilution tank T and by pipe 23 to the second filter S. 2.8 gallons of fresh water from the fresh water line 58 (which supplies 14.2 gallons in all) is used for spraying the starch on filter R, and 2.8 gallons for the second filter S, this water entering said filter at 59. The washed starch is discharged at 49 and contains 3.1 gallons of water. The balance of the starch and gluten mixture concentrated in the concentrator N, containing 0.9 gallon of water, the mixture being approximately half solids and half water, passes to the low solubles tables O² through pipe 60 after having been diluted with 3 gallons of fresh water supplied through pipe 61. If desired all the concentrated mixture from N could be run over tables O², and in any case light starch liquor low in solubles could be used in part or wholly in place of fresh water. The preferred arrangement shown will give a starch and gluten liquor of 11°–11.5° Baumé containing 3.9 gallons of water. It is a liquid very low in solubles. It may contain about 60 grains per gallon of water. The gluten and water from tables O² pass into the gluten settler P², from which the gluten is withdrawn, pressed in the press Q², and discharged from the system at 62, containing 0.2 gallon of water; the water from the press being returned to settler P² through pipe 18. The over-flow water from the gluten settler P² goes to the sewer through pipe 63. As the volume of this water is small, approximately 3 gallons, and its solubles content is very low, the loss of solubles is small and the risk of stream pollution slight. The starch is flushed from the low solubles tables O² with 5.6 gallons of fresh water introduced through pipe 64, and the flushed starch, containing 6.3 gallons of water, passes through pipe 65 to the dilution tank T. While the starch from the low solubles tables might be mixed with the starch from the high solubles tables and the mixture given to successive filtrations, it is sufficient and more economical to introduce the starch from tables O² into the washing system between the two filters, since the solubles content of this starch is so low that a single filtration will ordinarily be adequate.

The filtrate from the first filter R, 7.1 gallons, is returned to the coarse and fine slop washes, 3.1 gallons going through pipe 66 to the coarse slop wash, and 4.0 gallons through pipe 67 to the fine slop wash. Of the filtrate from the second filter S, the solubles content of which will be low, 4.1 gallons are conducted through pipe 68 to the high solubles tables O' for flushing the starch from these tables, and 4.3 gallons through pipes 69, 67 to the fine slop wash.

The seven gallon draw-off of steep water is merely illustrative and typical. The draw-off might be greater or less than this. For example the system could be balanced for a smaller draw-off with correspondingly increased discharge to the sewer from the tables O² which would decrease cost of evaporation of steep water but entail larger loss of solubles. On the other hand by increasing the draw-off to something more than seven gallons, the loss to the sewer could be further reduced.

In a so-called bottled-up system in accordance with Patent No. 1,651,611 above referred to, all the water used for washing the starch must find exit from the system through the steeps (except the water absorbed in and leaving the system with the solids); and enough water must be used at the starch washing filters to wash the starch to the purity that the trade may demand. This means that in such a system, the steep water draw-off is relatively high. In practice it cannot be less than substantially seven gallons. In the improved system just described an outlet is provided for some of the water used for washing the starch, and this without incurring any considerable loss in yield, since the discharged water is low in solubles, so that the draw-off need not be as high as seven gallons or, what amounts to the same thing, with this draw-off more water may be used for starch washing. In other words, the steep water draw-off can be small and the amount of water used for washing the starch large. The arrangement is particularly desirable where the cost of fuel is high, making evaporation of the steep water expensive, and where the sewering of a comparatively small amount of settler water, low in solubles, is unobjectionable.

The process of this application has features in common with the process disclosed in application, Serial No. 668,095, filed April 26, 1933 as a continuation in part hereof. So far as any inventions common to the two applications are concerned, such inventions are covered generically in said other application. No claim is made herein, generically, to the concentration of the starch milk, or part thereof derived from the fine slop system, the tabling of the starch milk at densities higher than heretofore practiced and the re-use in the wet starch system of the water eliminated by the concentrating operation; said process steps and combination of steps being claimed broadly in the before mentioned application and in a divisional application thereof filed December 2, 1934, Serial No. 757,179 and being claimed in the present case only in connection with features of operation that are unique herein.

According to this, the present invention, the mixtures of starch and gluten are tabled to remove the gluten at densities of 11° to 11.5° Baumé. This is a much higher density than has been heretofore thought possible for successful tabling. Ordinary table gravities have been about 7° Baumé, frequently less than this and very infrequently or never more than 8° Baumé. It has been discovered, however, to be possible to obtain with the higher gravity liquors a separation on the starch tables as between the starch and the gluten practically as good as the separation effected at the customary gravities of 7° Baumé or lower, provided the liquor is delivered to the tables at a proportionally decreased rate per minute and with the inclination of the tables increased. For example, it has been customary to feed the 7° Baumé starch and gluten magma at the rate of approximately three gallons per minute to tables of the usual dimensions and pitch, that is, about 110 feet long, 2 feet wide, and with a pitch of 5 inches from end to end. With a table gravity of 11°–11.5° Baumé practically as effective a separation can be obtained if the magma is delivered to the table heads at the rate of about 1.8 gallons per minute with the table pitch about 10 inches. This principle, claimed more generically in the co-pending applications above referred to, is utilized in the process of the present invention in connection with distinctive features of the herein disclosed process, namely the employment of high and low solubles tables and the dilution with fresh water after concentration of the starch-gluten mixture going to the low solubles tables. The advantage of this two-table system is that the steep water draw-off may be relatively low without having the tabling density near the upper limit of what is possible. Any decrease in steep water draw-off effects an economy of steam used in evaporating the steep water. In any given installation this item of cost of evaporation will have to be compared with the loss to the sewer of solubles (ignoring for the moment the stream pollution problem which may or may not exist according to the location of the factory), and the water balance adjusted to give, under the circumstances, the most economical steep water draw-off and sewer discharge, having in view the table density found to be best adapted for the tabling equipment being used. These modifications of the method will be obvious to those skilled in the art from the above description of the invention. The particular water balance shown in the drawing is illustrative merely. It is the intention to cover all modifications of the disclosed method within the scope of the appended claims. The invention is not limited to the use of any particular forms of apparatus for carrying out the separations and other operations which the process requires.

The term "fresh water" is used in a relative sense. Practically all water contains soluble substances. By "fresh water" is intended either water from service pipes, wells, etc., or process water containing very small quantities of soluble or other residual process substances in comparison with the quantity of such substances in the material treated by such "fresh water".

I claim:

1. Continuous process of manufacturing starch from corn which comprises: steeping the corn; subjecting the steeped corn in a comminuted state and in water to germ separating and germ washing operations, a coarse slop washing operation, and a fine slop washing operation yielding starch and gluten liquors having different solubles contents, concentrating the liquor from the fine slop wash and tabling a portion of it mixed with the liquors from the germ separation and coarse slop wash; removing the water from the gluten and returning the gluten water to the steeping operation; diluting the rest of the concentrated liquor from the fine slop wash with fresh water and tabling it; and separating the water from the resultant gluten and water mixture and discharging it from the system.

2. Continuous process of manufacturing starch from corn which comprises: steeping the corn; subjecting the steeped corn in a comminuted state and in water to germ separating and germ washing operations, a coarse slop washing operation, and a fine slop washing operation yielding starch and gluten liquors of different solubles content; concentrating the liquor from the fine slop wash and tabling a portion of it mixed with the liquors from the germ separation and coarse slop wash; removing the water from the gluten slop wash; and returning the gluten water to the steeping operation; diluting the rest of the concentrated liquor from the fine slop wash with fresh water and tabling it; separating the water from the resultant gluten and water mixture and discharging it from the system; washing the starch derived from both tabling operations in washing operations yielding filtrates light and relatively heavier in solubles; diluting the tabled starch, before washing, with the lighter solubles filtrate; and returning the heavier solubles filtrate and the water eliminated during the concentrating operation to the steps of the process following the steeping of the corn and preceding the tabling operation.

3. In a continuous process of manufacturing starch from corn comprising steeping the corn; subjecting the steeped corn in a comminuted state and in water to separating operations yielding a starch and gluten liquor; eliminating water from such liquor and reusing the eliminated water in the separating operations; diluting with water some of the starch and gluten liquor concentrated as aforesaid and tabling the same to separate the gluten from the starch; separately tabling the rest of the starch and gluten liquor; and re-using the gluten water for steeping corn.

4. In a continuous process of manufacturing starch from corn comprising steeping the corn; subjecting the steeped corn in a comminuted state and in water to separating operations yielding a starch and gluten liquor; eliminating water from such liquor and re-using the eliminated water in the separating operations; diluting with fresh water some of the starch and gluten liquor concentrated as aforesaid and tabling the same to separate the gluten from the starch; separately tabling the rest of the starch and gluten liquor; and re-using the gluten water for steeping corn.

5. In a continuous process of manufacturing starch from corn comprising steeping the corn; subjecting the steeped corn in a comminuted state and in water to separating operations yielding a starch and gluten liquor; eliminating water from such liquor and re-using the eliminated water in the separating operations; diluting with water a portion of the starch and gluten liquor concentrating and tabling the same; separately tabling the remainder of the concentrated starch and gluten liquor with the unconcentrated starch and gluten liquor and re-using the gluten water from said tabling operation for stepping corn.

6. In a continuous process of manufacturing starch from corn comprising steeping the corn; subjecting the steeped corn in a comminuted state and in water to separating operations yielding a starch and gluten liquor; eliminating water from such liquor and re-using the eliminated water in the separating operations; diluting with water some of the starch and gluten liquor concentrated as aforesaid and separating the starch therefrom; effecting by a different operation a separation of the starch and the gluten from the rest of the starch and gluten liquor and re-using the water which remains for steeping corn.

7. In a continuous process of manufacturing starch from corn comprising steeping the corn; subjecting the steeped corn in a comminuted state and in water to separating operations yielding liquors of starch and gluten relatively high and relatively low in solubles; separating the starch and gluten from the high solubles liquor and re-using the water therefrom for steeping corn; and by a different operation separating the starch and gluten from the low solubles liquor and discharging the remaining water from the system.

8. In the process of manufacturing starch from corn comprising steeping the corn, subjecting the corn in a comminuted state to separating operations in water, yielding mixtures of starch, gluten and water having different solubles contents: the improvement which consists in separately tabling the starch-gluten mixtures after concentrating the same to give densities substantially above 8° Baumé.

9. In the process of manufacturing starch from corn comprising steeping the corn, subjecting the corn in a comminuted state to separating operations in water, yielding mixtures of starch, gluten and water having different solubles contents: the improvement which consists in separately tabling the starch-gluten mixtures after concentrating the same to give densities substantially above 8° Baumé, and re-using for steeping corn the water from the mixture of higher solubles content.

10. In the process of manufacturing starch from corn comprising steeping the corn, subjecting the corn in a comminuted state to separating operations in water, yielding mixtures of starch, gluten and water having different solubles contents: the improvement which consists in separately tabling the starch-gluten mixtures after concentrating the same to give densities substantially above 8° Baumé; re-using for steeping corn the water from the mixture of higher solubles content; and discharging from the system the water from the mixture of lower solubles content.

11. In the process of manufacturing starch from corn comprising steeping the corn, subjecting the corn in a comminuted state to separating operations in water, yielding mixtures of starch, gluten and water having different solubles contents: the improvement which consists in separately tabling the starch-gluten mixtures after extracting water from the mixture having the lower solubles content to give the same a density substantially above 8° Baumé.

12. In the process of manufacturing starch from corn comprising steeping the corn, subjecting the corn in a comminuted state to separating operations in water, yielding mixtures of starch, gluten and water having different solubles contents: the improvement which consists in separately tabling the starch-gluten mixtures after extracting water from the mixture of lower solubles content and diluting it with fresh water to give such mixture a density substantially above 8° Baumé.

13. In the process of manufacturing starch from corn comprising steeping the corn, subjecting the corn in a comminuted state to separating operations in water, yielding mixtures of starch, gluten and water having different solubles contents: the improvement which consists in separately tabling the starch-gluten mixtures at densities substantially above 8° Baumé after extraction of water from the mixture of lower solubles content and diluting the same with fresh water.

14. In the process of manufacturing starch from corn comprising steeping the corn, subjecting the corn in a comminuted state to separating operations in water, yielding mixtures of starch, gluten and water having different solubles contents: the improvement which consists in recovering starch and gluten from the mixture having the higher solubles content and re-using the resultant water for steeping corn; and by additional operations recovering separately one from the other starch and gluten from the mixture having the lower solubles content.

15. In the process of manufacturing starch from corn comprising steeping the corn, subjecting the corn in a comminuted state to separating operations in water, yielding mixtures of starch, gluten and water having different solubles contents: the improvement which consists in recovering starch and gluten from the mixture having the higher solubles content and re-using the resultant water for steeping corn; and by additional operations separately recovering starch and gluten from the mixture having the lower solubles content and discharging the resultant water from the system.

16. In the process of manufacturing starch from corn comprising steeping the corn, subjecting the corn in a comminuted state to separating operations in water, yielding mixtures of starch, gluten and water having different solubles contents: the improvement which consists in recovering starch and gluten from the mixture having the higher solubles content and re-using the resultant water for steeping corn; concentrating the mixture having the lower solubles content by elimination of water therefrom; and by additional operations treating said concentrated material to separate the starch and the gluten.

17. In the process of manufacturing starch from corn comprising steeping the corn, subjecting the corn in a comminuted state to separating operations in water, yielding mixtures of starch, gluten and water having different solubles contents: the improvement which consists in recovering starch and gluten from the mixture having the higher solubles content and re-using the resultant water for steeping corn; concentrating the mixture having the lower solubles content by elimination of water therefrom; diluting the concentrated material with fresh water; and recovering starch and gluten therefrom.

18. In the process of manufacturing starch from corn comprising steeping the corn, subjecting the corn in a comminuted state to separating operations in water, yielding mixtures of starch, gluten and water having different solubles contents: the improvement which consists in recovering starch and gluten from the mixture having the higher solubles content and re-using the resultant water for steeping corn; concentrating the mixture having the lower solubles content by elimination of water therefrom; diluting the concentrated material with fresh water; recovering starch and gluten therefrom; and re-using the water eliminated from the material in said concentrating operation for separating operations on comminuted corn.

19. In the process of manufacturing starch from corn comprising steeping the corn, subjecting the corn in a comminuted state to separating operations in water, yielding mixtures of starch, gluten and water having different solubles contents: the improvement which consists in recovering starch and gluten from the mixture having the higher solubles content and re-using the resultant water for steeping corn; concentrating the mixture having the lower solubles content by elimination of water therefrom; diluting the concentrated material with fresh water; recovering starch and gluten therefrom; re-using the water eliminated from the material in said concentrating operation for separating operations on comminuted corn; and discharging the water from the starch-gluten mixture of lower soluble concentration from the system.

20. In the process of manufacturing starch from corn comprising steeping the corn, subjecting the corn in a comminuted state to separating operations in water, yielding mixtures of starch, gluten and water having different solubles contents: the improvement which consists in concentrating the mixture of lower solubles concentration; mixing some of it with the mixture of higher solubles concentration; recovering the starch and gluten from said last named mixture and re-using the water for steeping corn; diluting the rest of the concentrated material with fresh water; and recovering the starch and gluten therefrom.

21. In the process of manufacturing starch from corn comprising steeping the corn, subjecting the corn in a comminuted state to separating operations in water, yielding mixtures of starch, gluten and water having different solubles contents: the improvement which consists in concentrating the mixture of lower solubles concentration; mixing some of it with the mixture of higher solubles concentration; recovering the starch and gluten from said last named mixture and re-using the water for steeping corn; diluting the rest of the concentrated material with fresh water; recovering the starch and gluten therefrom; and discharging the resultant water from the system.

22. In the process of manufacturing starch from corn comprising steeping the corn, subjecting the corn in a comminuted state to separating operations in water, yielding mixtures of starch, gluten and water having different solubles contents: the improvement which consists in separately treating said mixtures to separate and recover the starch and gluten and extract the process waters therefrom.

23. In the manufacture of starch from corn comprising comminuting the corn and subjecting it in water to germ, course slop and fine slop separations yielding, from each separation, a mixture of starch, gluten and water; the improvement which consists in subjecting a portion of the starch-gluten mixture from the fine slop system, and the rest of the starch-gluten mixtures, separately, to operations for the separation one from the other and recovery of the starch and gluten.

24. In the manufacture of starch from corn comprising comminuting the corn and subjecting it in water to germ, coarse slop and fine slop separations yielding, from each separation, a mixture of starch, gluten and water: the improvement which consists in subjecting a portion of the starch-gluten mixture from the fine slop system and the rest of the starch-gluten mixtures, separately, to operations for the separation one from the other and the recovery of the starch and gluten after extracting some of the process water from the mixture derived from the fine slop system.

25. In the manufacture of starch from corn comprising comminuting the corn and subjecting it in water to germ, coarse slop and fine slop separations yielding, from each separation, a mixture of starch, gluten and water: the improvement which consists in subjecting a portion of the starch-gluten mixture from the fine slop system and the rest of the starch-gluten mixtures, separately, to operations for recovery of the starch and gluten after extracting some of the process water from the mixture derived from the fine slop system; and diluting with fresh water the portion of the concentrated material separately treated.

26. In the manufacture of starch from corn comprising steeping the corn, comminuting it and subjecting it in water to germ, coarse slop and fine slop separations, yielding from each separation a mixture of starch, gluten and water: the improvement which consists in subjecting a major portion of the starch-gluten mixture from the fine slop system to operations for the extraction of the process water therefrom and the separate recovery of the starch and gluten; subjecting the rest of said starch and gluten mixtures to additional operations for the separation of the starch and gluten and extraction of the process water therefrom; and utilizing said last named process water for steeping corn.

27. In the manufacture of starch from corn comprising steeping the corn, comminuting it and subjecting it in water to germ, coarse slop and fine slop separations, yielding from each separation a mixture of starch, gluten and water: the improvement which consists in subjecting a major portion of the starch-gluten mixture from the fine slop system to operations for the separation of the starch and gluten and extraction of the process water therefrom; subjecting the rest of said starch and gluten mixtures to additional operations for the separation of the starch and gluten and extraction of the process water therefrom; utilizing said last named process water for steeping corn; and discharging the first mentioned process water from the system.

28. In the manufacture of starch from corn comprising steeping the corn, comminuting it and subjecting it in water to germ, coarse slop and fine slop separations, yielding from each separation a mixture of starch, gluten and water: the improvement which consists in extracting process water from the starch-gluten mixture from the fine slop separation and utilizing the extracted process water for separating operations on comminuted corn; diluting with fresh water said concentrated material, subjecting it to operations for the separation of starch and gluten and extraction of the water therefrom, and discharging said water from the system; subjecting the rest of the starch-gluten mixtures to operations for the separation of the starch and gluten and extraction of the process water therefrom, and using said last named process water for steeping corn.

29. In the manufacture of starch from corn comprising steeping the corn, comminuting it and subjecting it in water to germ, coarse slop and fine slop separations, yielding from each separation a mixture of starch, gluten and water: the improvement which consists in extracting process water from the starch-gluten mixture from the fine slop system and utilizing the extrated water in separating operations on comminuted corn; diluting a part of the concentrated material with fresh water and subjecting it to operations for the separation of the starch and gluten and extraction of water therefrom, and discharging the extracted water from the system; mixing the rest of the concentrated material with the starch-gluten mixtures from the germ and coarse slop separations, subjecting this mixture to operations for recovery of the starch and gluten and utilizing the resultant process water for steeping corn.

30. In the manufacture of starch from corn in which the corn is subjected in a comminuted state and in water to separating operations yielding separate mixtures of starch, gluten and water having different contents of solubles: the improvement which comprises treating said mixtures separately, for the separate recovery in each case of the starch and the gluten, and thereby obtaining gluten water effluents of high and low solubles content respectively.

31. In the manufacture of starch from corn in which the corn is subjected in a comminuted state and in water to separating operations yielding separate mixtures of starch, gluten and water having different contents of solubles: the improvement which comprises separately tabling said mixtures and removing gluten from the water so as to obtain effluents of high and low solubles content respectively.

32. In the manufacture of starch from corn in which the corn is subjected in a comminuted state and in water to germ, coarse slop and fine slop separating operations: the improvement which consists in treating the starch and gluten mixture from the fine slop separating operation separately from the rest of the starch and gluten; for recovery separately one from the other of the starch and the gluten.

33. In the manufacture of starch from corn in which the corn is subjected in a comminuted state and in water to germ, coarse slop and fine slop separating operations: the improvement which consists in tabling the starch and gluten from the fine slop separation separately from the rest of the starch and gluten.

34. In the manufacture of starch from corn in which the corn is subjected in a comminuted state and in water to germ, coarse slop and fine slop separating operations: the improvement which consists in tabling the starch and gluten from the fine slop separation separately from the rest of the starch and gluten after first extracting water therefrom and mixing fresh water therewith.

35. In the manufacture of starch from corn in which the comminuted corn is subjected to separating operations in water yielding mill starch streams of different solubles contents; the improvement which consists in tabling the part of the mill starch having the higher solubles content to recover starch and separating the gluten from the table effluent; and by separate operations tabling the rest of the mill starch and separating the gluten from the table effluent.

36. Process of manufacturing starch from corn comprising: subjecting the corn in a comminuted state to separating operations in water yielding mill starch streams of different solubles contents; treating said streams separately to separate the gluten from the starch; washing the starch from the high solubles mill starch stream successively in two washing operations; and mixing with said starch between said washing operations the starch from the low solubles mill starch stream.

FREDERICK L. JEFFERIES.